July 22, 1930.  W. E. BURKARD  1,771,374
PIE PAN
Filed Oct. 19, 1928
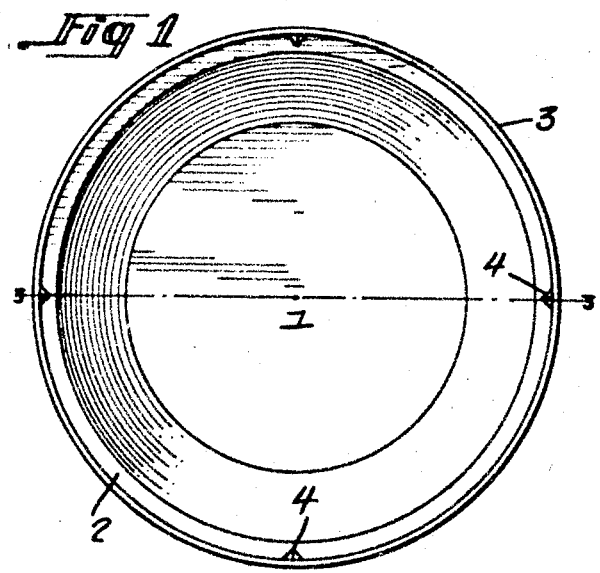
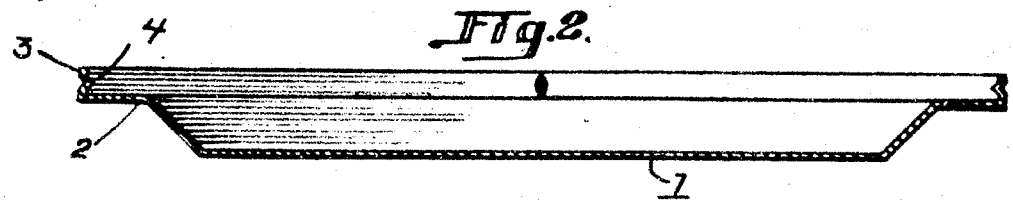
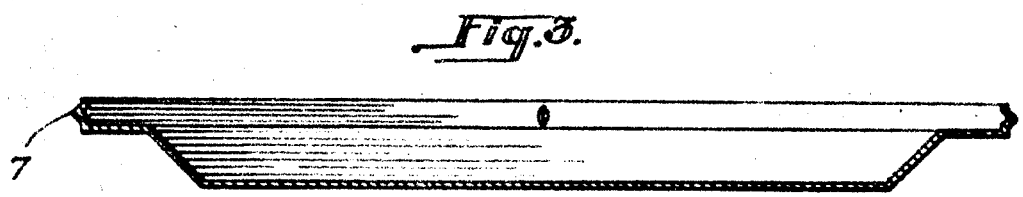
W. E. Burkard
INVENTOR
BY Victor J. Evans
ATTORNEY Patented July 22, 1930

1,771,374

UNITED STATES PATENT OFFICE

WALTER E. BURKARD, OF CONNERSVILLE, INDIANA

PIE PAN

Application filed October 19, 1928. Serial No. 313,553.

The object of this, my present invention is the provision of a pan for pies or like pastries that is integrally provided with indicating means whereby the pie or pastry baked therein may be cut into equal size pieces or slices.

To the attainment of the foregoing the invention consists in the improvement hereinafter described and definitely claimed.

In the drawings:

Figure 1 is a top plan view of one form of the improvement.

Figure 2 is a sectional view approximately on the line 3—3 of Figure 1.

Figure 3 is a similar sectional view but illustrating a slight modification.

The pan or pastry plates illustrated by the drawings may be of metal, fire proof glass or the like. In Figures 1 to 3 the pan 1 has its upper edge formed with an outstanding ledge 2 provided with an upstanding flange 3. The flange 3, at equidistantly spaced intervals, is from its outer edge inwardly indented to provide cross sectionally V-shaped lugs or projections 4. When it is desired to cut the pie or pastry baked in the pan as above described, the operator places his or her thumb under the ledge 2 and brings his forefinger into the depression formed by the inwardly extending lug 4. When his forefinger is thus arranged he will cut the pie from the center to the lug, and by again placing his hand upon other portions under the ledge and into other depressions he can proceed with the slicing of the pie or pastry so that all of the pieces thereof will be cut at the same size.

In Figure 3 the directing marks are formed upon the upstanding flange of a pan similar to that shown in Figures 1 and 2 but instead of having the lugs projecting inwardly the same extend outwardly. These lugs are indicated by the numeral 7.

Having described the invention, I claim:

A pie plate having its edge formed with a ledge extension in the nature of a disk, said disk having its edge formed with an upstanding continuous flange, and projections formed on the upstanding flange and arranged at diametrically opposite points for the purpose specified.

In testimony whereof I affix my signature.

WALTER E. BURKARD.